United States Patent [19]

Morgan et al.

[11] Patent Number: 5,924,071
[45] Date of Patent: Jul. 13, 1999

[54] METHOD AND APPARATUS FOR OPTIMIZING A PLAYLIST OF MATERIAL

[75] Inventors: Oliver Frederick Morgan, San Jose, Calif.; Michael Powell, Sherwood, Oreg.; Douglas Koji Tao, San Jose, Calif.

[73] Assignees: Sony Corporation, Tokyo, Japan; Sony Electronics, Inc., Park Ridge, N.J.

[21] Appl. No.: 08/925,098

[22] Filed: Sep. 8, 1997

[51] Int. Cl.[6] .................................................. G11B 20/18
[52] U.S. Cl. ............................... 704/278; 369/32; 369/53
[58] Field of Search .............................. 704/278; 369/32, 369/2, 53, 60, 54

[56] References Cited

U.S. PATENT DOCUMENTS

| | | | |
|---|---|---|---|
| 4,538,188 | 8/1985 | Barker et al. | 360/143 |
| 5,148,514 | 9/1992 | Arima et al. | 395/24 |
| 5,262,865 | 11/1993 | Herz | 358/181 |
| 5,659,528 | 8/1997 | Kojima et al. | 369/48 |
| 5,680,378 | 10/1997 | Miyake | 369/48 |
| 5,687,161 | 11/1997 | Owaki | 369/275.6 |
| 5,745,445 | 4/1998 | Yasukohchi et al. | 369/32 |
| 5,748,585 | 5/1998 | Tsukamoto et al. | 369/47 |

*Primary Examiner*—David R. Hudspeth
*Assistant Examiner*—Harold Zintel
*Attorney, Agent, or Firm*—Blakely, Sokoloff, Taylor & Zafman

[57] ABSTRACT

A memory that includes data corresponding to a play list is controlled by an associated circuit that eliminates the problems created during playback by short data segments. The play list is parsed to determine whether any segments in the play list fail to exceed a threshold length. Such a segment is copied along with all or part of the next segment to create a new "virtual" segment that exceeds the threshold length. During playback, the virtual segment is used instead of the original short segment.

23 Claims, 10 Drawing Sheets

METHOD AND APPARATUS FOR OPTIMIZING A PLAYLIST OF MATERIAL

BACKGROUND OF THE INVENTION

1. Field of the Invention

The present invention relates to the field of audio/video processors, storage devices and servers, and more particularly, to random access audio/video systems.

2. Art Background

Video editing systems have evolved from providing simple editing cuts to the incorporation of full feature graphics, film-to-tape, and other processes to complete a video production. Non-linear random access video editing systems permit access to any video frame from any location on the storage media and rearrangement of the frame into a desired output. The coupling of computer technology with video tape editing systems, as well as multimedia hardware and software support, including, by way of example, CD ROM technology, magnetic storage media and graphic user interface technology, permits the editor to incorporate and integrate various production media resources such as special effects, music, graphics, and the like into a production.

One of the requirements of any multimedia video/audio editing system is to provide the operator with the ability to manage large quantities of information in an understandable and efficient manner. The system must be flexible and intuitive, to accommodate a variety of operator editing styles and personalities. Various video tape editing systems have been developed in the past, for example the Sony DNE-300 manufactured by Sony Corporation of Tokyo, Japan.

In video editing systems, a user requests that a number of audio/visual segments be displayed in a particular order. The limits on memory access time causes problems in prior art video editing systems. In particular, any type of memory, especially on media such as hard and floppy drives and CD ROMs, employed by video editing systems requires time to fetch different segments. For any segment, the system must fetch the next segment before the current segment is completely displayed. Otherwise, there will be a gap between the display of the first segment and the display of the second segment while the system is reading the next segment. This gap may be unacceptable to users who desire uninterrupted audio/video playback.

Short segments in particular may cause such gaps because the system may not have enough time to fetch the material of the next segment before it finishes reading the material of the short segment. The amount of time required to fetch the material of a next segment is known as the threshold length; any segment shorter than the threshold length will cause a gap.

Prior art systems will either refuse to replay a sequence containing short segments (displaying an error message to the user), or else they display these segments with noticeable and unacceptable gaps following them. The present invention is a random-access video editing system designed to play back a sequence containing one or more short segments without any gaps.

SUMMARY OF THE INVENTION

According to the present invention, a memory that includes data corresponding to a play list is controlled by an associated circuit ("main control unit"), such as a central processing unit, such that the gap problems of the prior art are eliminated. The main control unit receives a play list and parses the play list to determine whether any segments in the play list fail to exceed a threshold length. Each such segment is copied along with all or part of the next segment to create a new "virtual" segment that exceeds the threshold length. For example, for a threshold length of a predetermined amount of time of a next segment may be added to another segment to create a "virtual" segment of a combined length equal to the sum of the first segment and portion of the second segment. Alternatively, two consecutive segments may simply be merged to create a new segment comprising the length of the two segments combined.

The virtual segments are stored in a cache memory and the play list is modified to point to the virtual segments as necessary. Thus, during playback, instead of retrieving a short problem segment from its original location in memory, the server retrieves the virtual segment. The play list is also modified as necessary to point to revised starting locations in the memory for those segments that have been partly added to a short segment to create a virtual segment.

BRIEF DESCRIPTION OF THE DRAWINGS

FIG. 4a illustrates a play list input by a user and FIG. 4b illustrates a new play list input by a user subsequent to the play list illustrated in FIG. 4a and the reuse of a virtual segment that was created with respect to the play list in FIG. 4a.

DETAILED DESCRIPTION OF THE INVENTION

In the following description, numerous specific details are set forth, such as functional blocks representing certain data processing devices, component configurations, signals, data and control flow paths, and the like, to provide a thorough understanding of the present invention. However, it will be apparent to one skilled in the art that the present invention may be practiced without these specific details. In many instances, well known circuits and structures are not described in detail in order not to obscure the present invention unnecessarily.

Figure 1:
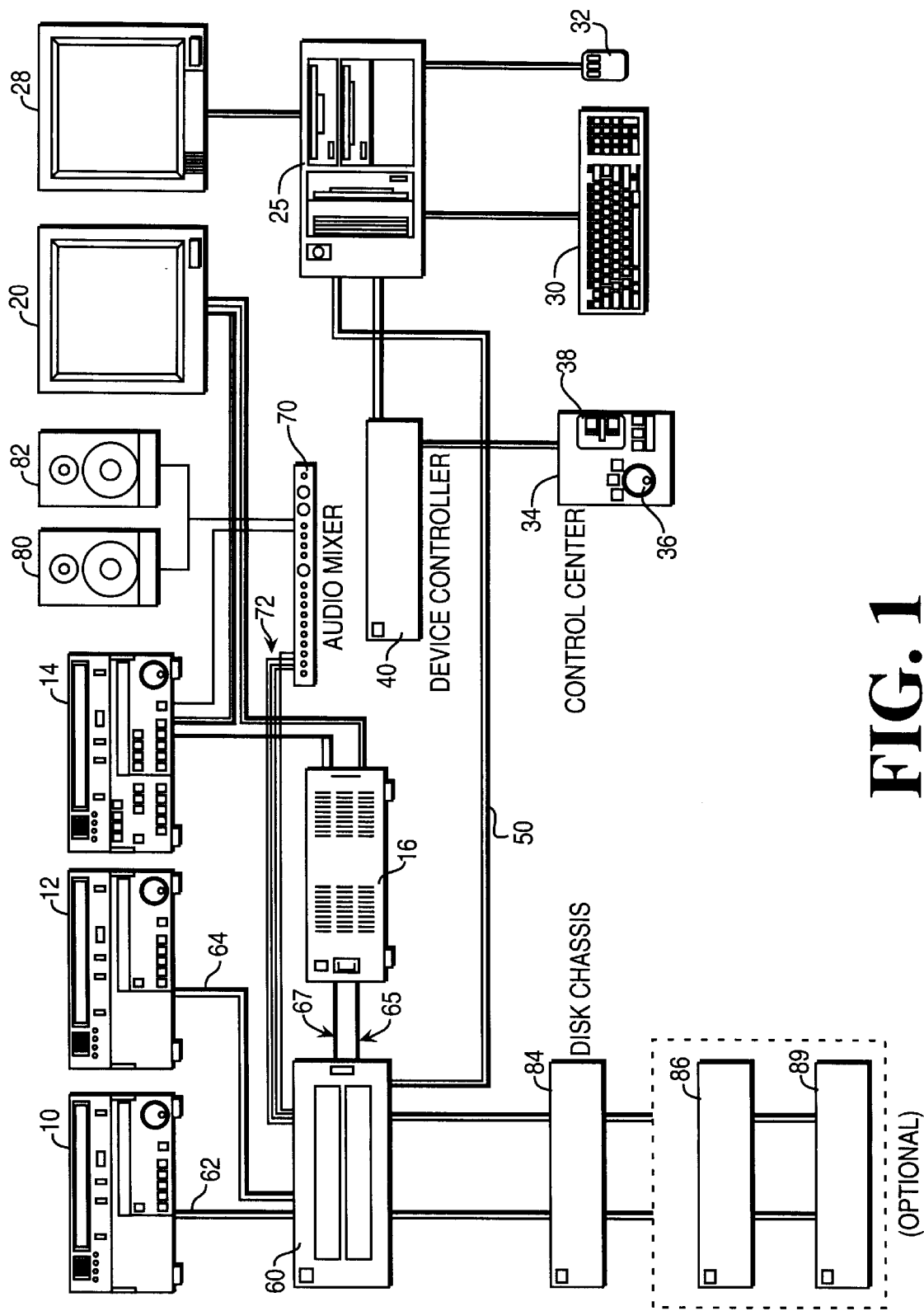
FIG. 1 illustrates a block diagram of a system configuration for one embodiment of the present invention.

Referring now to FIG. 1, one possible system for implementing the present invention is illustrated. As will be appreciated from the following description, the present invention has applicability to client server architectures, single computer architectures which include a CD-ROM as a mass storage device, wide area networks and any other type of architecture.

As shown in FIG. 1, dual source video tape recorders (VTRs) 10 and 12 provide original source material to the system illustrated in the figure. A record VTR 14 records the edited audio/video material for later viewing. As shown in FIG. 1, the record VTR 14 is coupled to an effects device 16, which in the presently preferred embodiment, comprises a Sony DFS 500 DME Switcher. As shown, the record VTR 14 is further coupled to a monitor 20 for displaying video material recorded and stored on the VTR 14. The system illustrated in FIG. 1 further includes a computer 25, which, in the presently preferred embodiment, comprises a personal computer ("PC") utilizing an Intel® microprocessor. A video monitor 28 is coupled to the computer 25 for the display of a graphic user interface such as that implemented in the DNE 300 manufactured by Sony Corporation.

As illustrated in FIG. 1, a keyboard 30 is coupled to the computer 25 for providing input commands to the computer 25, as is well known. A cursor control device ("mouse") 32 is also coupled to the computer 25, for controlling the position of a cursor on the display 28. As shown, a control center 34 including a shuttle knob 36, fader bar 38, and other various controls is coupled to a device controller 40. The device controller 40 provides control signals to other video tape recorders, DME and mixing devices and the like, and is further coupled to the computer 25 as shown. The computer 25 is coupled over a "SCSI" bus 50 to a main control unit 60. The main control unit 60 receives data and commands over the bus 50 from the computer 25 in the form of play lists and/or direct commands. Moreover, the main control unit 60, as will be described in more detail in this Specification, is coupled to VTR 10 over video line 62, VTR 12 over video line 64, and the effects unit 16 over video lines 66 and 67. The main unit 60 is further coupled to an audio mixer 70 over four audio lines 72. The audio mixer 70 drives speakers 80 and 82 to permit the editor to listen to audio edits completed using the system illustrated in FIG. 1. The control unit 60 is further coupled to a magnetic (or optical) mass storage device 84, and optional mass storage devices 86 and 89, as shown.

It will be appreciated that the configuration of the present invention as illustrated in FIG. 1 is representative of one of many possible configurations which may be utilized in accordance with the teachings herein. In particular, the components illustrated in FIG. 1 may be rearranged, and, the main control unit 60 may be used in conjunction with other known components not illustrated.

Figure 2:
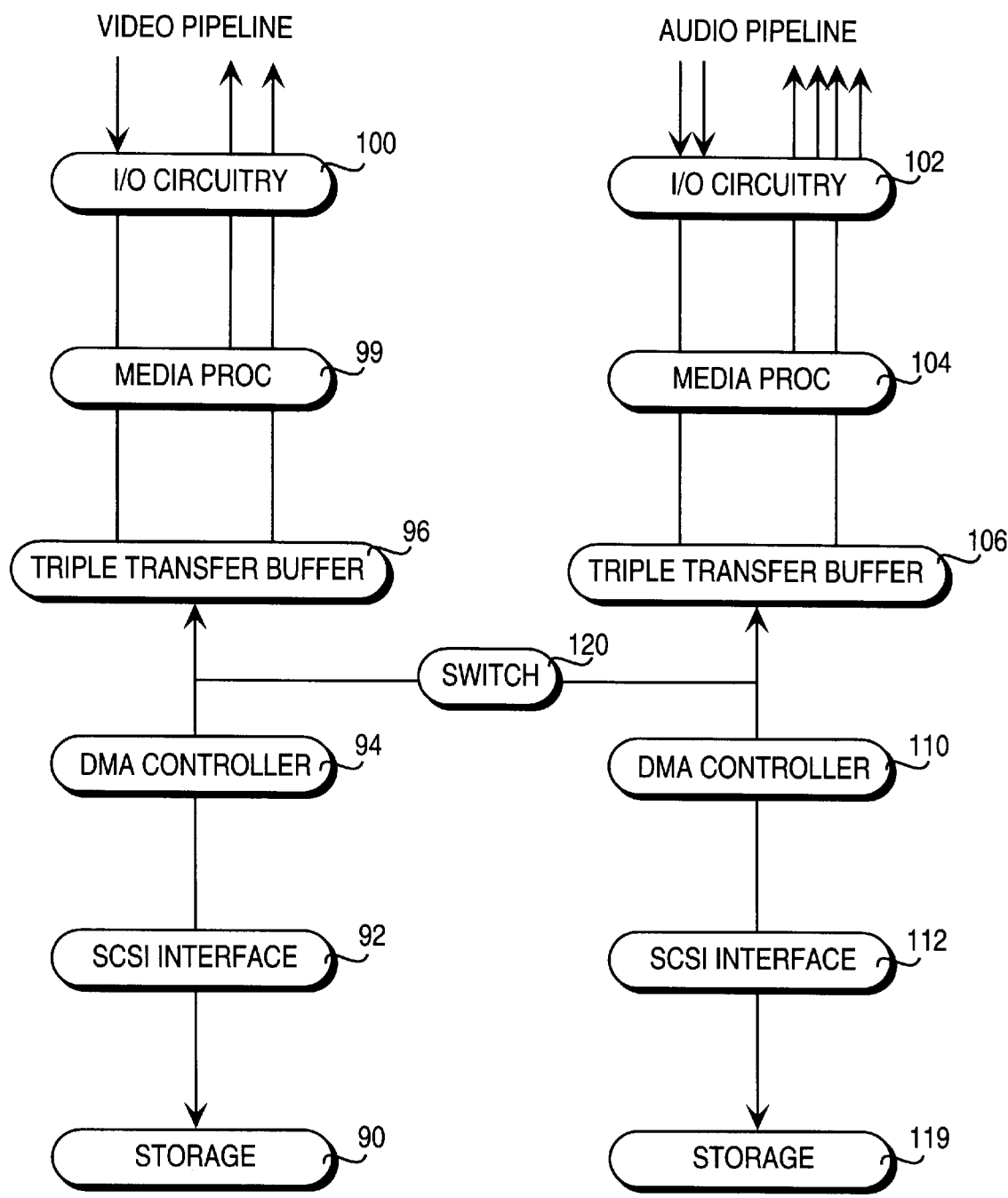
FIG. 2 illustrates a flow diagram of the media pipelines for one embodiment of the present invention.

Referring now to FIG. 2, a general overview of a possible media pipeline to be used in conjunction with the present invention will be described to provide additional background prior to a detailed description of the operation of the main control unit 60. The system of the present invention is based upon a media pipeline which comprises a storage device 90, such as for example, the magnetic disk 84 illustrated in FIG. 1. A "SCSI" interface 92 couples the control unit 60 to the storage device 90. A direct memory access ("DMA") controller 94 is coupled to the SCSI interface 92 and to a triple transfer buffer 96. A media processing functional block 99 is coupled to the triple transfer buffer 96, as well as input/output (I/O) circuitry 100. The I/O circuitry 100 receives and transmits video information from an external device. Similarly, as illustrated in FIG. 2, an external device is coupled to an audio I/O circuitry 102 for receiving audio signals. A media processing block 104 is coupled to the I/O circuitry 102 and to an audio triple transfer buffer 106 as shown. An audio DMA controller 110 is coupled to a SCSI interface 112 for controlling the storage and retrieval audio data in a storage device 119.

As is shown in FIG. 2, a switch 120 controls the transfer of media data, i.e., video and audio data in the pipelines, and permits the sharing of storage devices, buffers and the like between video and audio data, as will be described more fully herein. The overall purpose of the media pipelines is to move video and audio data quickly from one end of the pipeline to the other. In the presently preferred embodiment, the pipeline may move data at approximately 20 megabytes per second. The present invention stores compressed video information and uncompressed audio and requires, in the current embodiment, only 96 kilobytes per second throughput for each audio channel.

As mentioned, a user of the system illustrated in FIG. 1 provides a play list to the main control unit 60. The following describes examples of techniques employed by the main control unit 60 to provide a seamless playback of the play lists. It should be readily apparent the techniques may be performed by main control unit 60 or another processing device such as general purpose computer system. Furthermore, it should be realized that the techniques may be executed by logic or alternately by a processor executing instructions stored on media or received across a network.

Figure 3A:
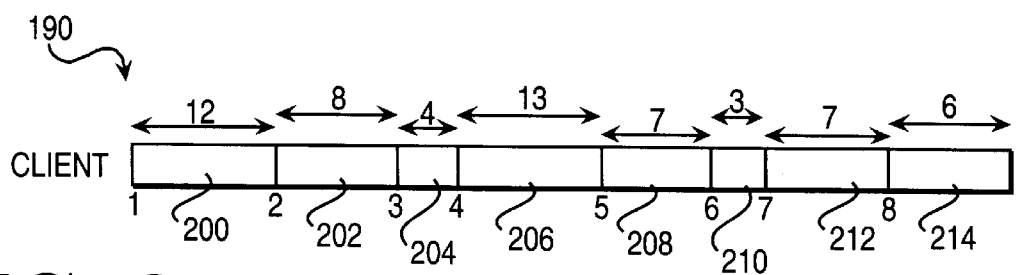
FIG. 3a illustrates a play list input by a user.

FIG. 3a illustrates a play list 190 input by a user. The play list comprises a plurality of segments 200, 202, 204, 206, 208, 210, 212 and 214, each segment corresponding to media data/material resident in different parts of a memory. In the figure, the length of a segment is indicated by a number above the segment. Each entry in a records the length of the segment and a pointer to the location of the material content in a memory or storage device. Thus, each segment typically includes an identification length value which corresponds to the length of time it takes to play the segment and a pointer to the location where the actual material content is stored.

As previously described, any type of memory, especially on media such as hard and floppy drives and CD ROMS, requires time to fetch different segments. For any segment, the system must fetch the next segment material before the material of the current segment is completely read. Otherwise, there is a gap between segments which creates a corresponding gap during playback of the segments, which is unacceptable to users who desire uninterrupted audio/video.

Short segments may cause such gaps because the system may not be able to fetch the next segment before it finishes displaying the short segment. In the present embodiment, the amount of time required to fetch a next segment is known as the threshold length; any segment shorter than the threshold length will cause an unacceptable gap.

The threshold length depends upon many characteristics of the system, including the type of memory used, the characteristics of the actual model of memory unit used, the organization of the data upon the storage medium (commonly referred to as the file system structure), and the desired data rate at which the video and audio content is encoded for storage. However, in practice, the threshold length for a system may be approximated as a constant, whose value is determined empirically. For example, the value may be approximately 1 second, although it may be as small as 0.1 second. The method described here for creating virtual segments works whether the threshold length is constant or must be calculated for each segment. Furthermore, it is contemplated that other system parameters not discussed herein may control the size of the threshold length.

Figure 3B:
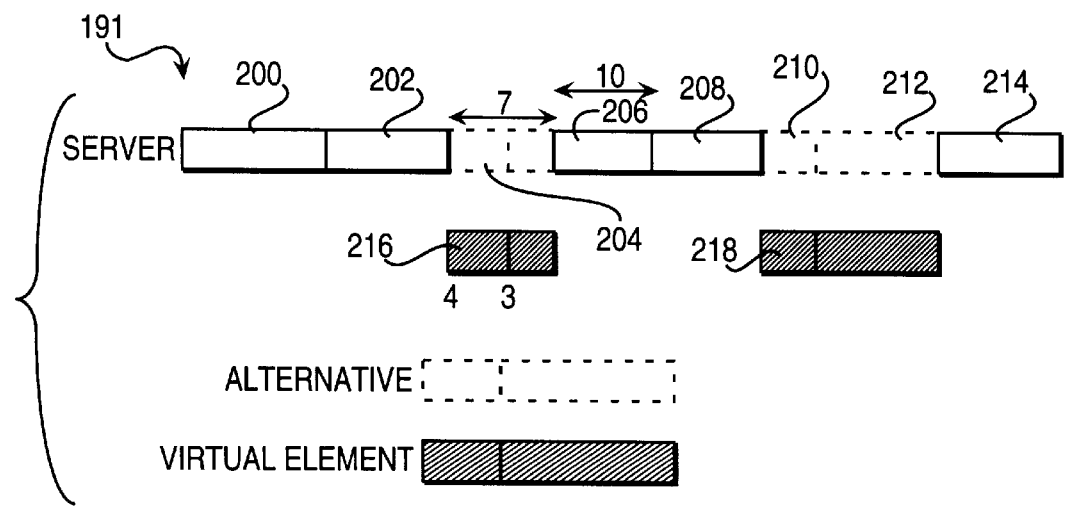
FIG. 3b illustrates the creation of "virtual segments" for those segments in the play list of FIG. 3a that may cause a problem during playback.

Continuing with the present embodiment, FIG. 3b illustrates two approaches used by the present invention to prevent such gaps from occurring. The main control unit 60 receives the play list 190 and searches it for segments that fail to exceed the threshold length. The material of such a segment is copied along with all or part of the material of a next segment to create a new "virtual" segment material that exceeds the threshold length. For example, for a threshold length of 6, segment material 204 falls below the threshold. Therefore, a new virtual segment composed of 4 seconds of segment material 204 plus 3 seconds of segment material 206 is created, leaving segment 206 with material of a length of 10.

Alternatively, the segment material may simply be merged to create a new segment of length 17, which exceeds the threshold length. In instances where the sum of the lengths of two consecutive segments is less than twice the threshold, then it is necessary to merge the segments to create a new segment. This circumstance is illustrated by segments 210 and 212, which are copied and merged into a "virtual segment" 218. Even if the sum of the lengths of two consecutive segment material is greater than twice the threshold, it may still be efficient in some systems to create a merged segment (rather than add to the length of one and decrease the length of the other).

The play list 190 is modified by the main control unit 60 to create a revised play list 191 that points to the new segment material 216 and 218, which are stored in a cache list. Playback then proceeds as normal, with the main control unit 60 using the modified play list 191 and the new segment(s) 216 and 218.

Figure 4A:
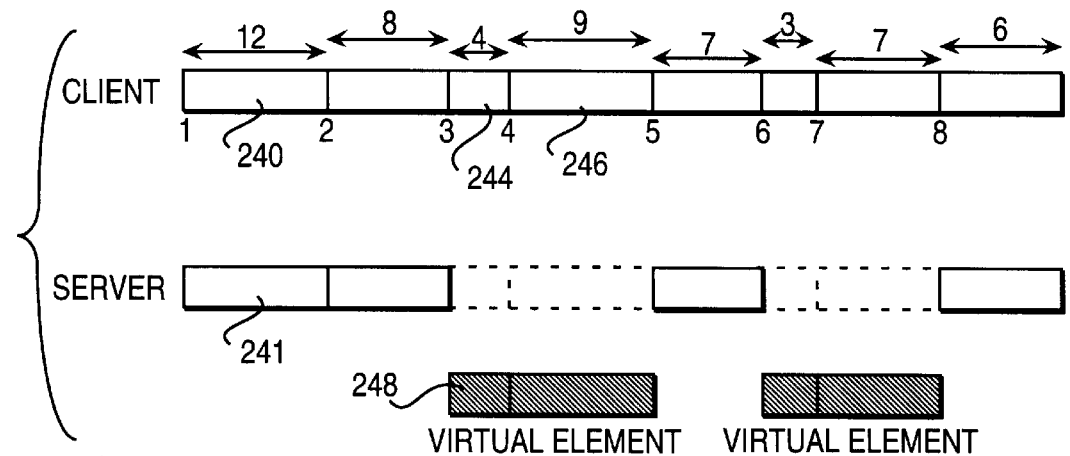
Figure 4B:
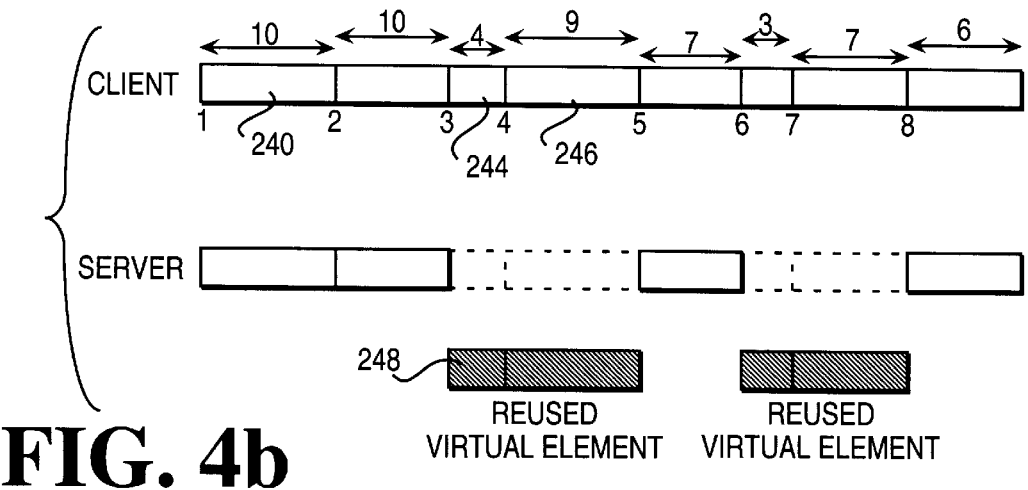

When a new play list is received, the same process is carried out, except that the cache list of virtual segments is consulted to avoid creating duplicates of virtual segments. For example, FIG. 4a illustrates a play list 240 input by a user and FIG. 4b illustrates a new play list 242 input by a user subsequent to the play list 240. As shown, a short segment 244 and a following segment 246 remain unchanged between the play list 240 and the play list 242. The main control unit 60 parses through the play list 242 to determine which virtual segments, such as a virtual segment 248, may be reused, thereby eliminating the need to recreate the virtual segment 248.

Figure 5A:
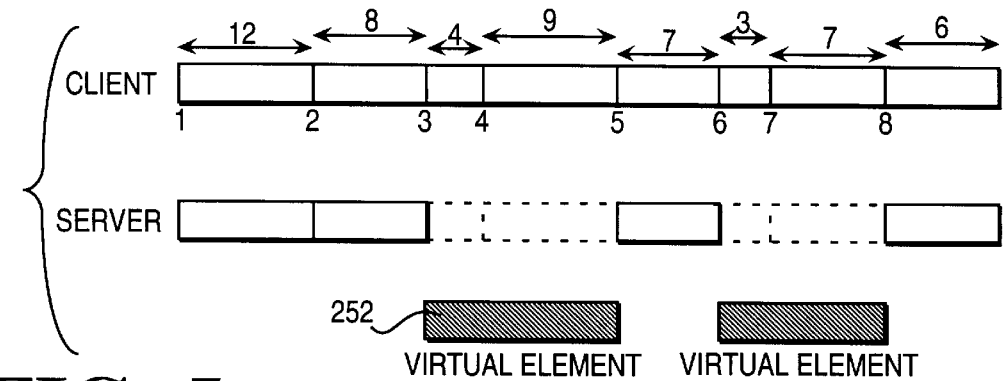
FIGS. 5a and 5b illustrate the maintenance of a virtual segment that is not currently being used but that may be reused at a later time if the user decides to revert to a play list that corresponds to such a virtual segment.
Figure 5B:
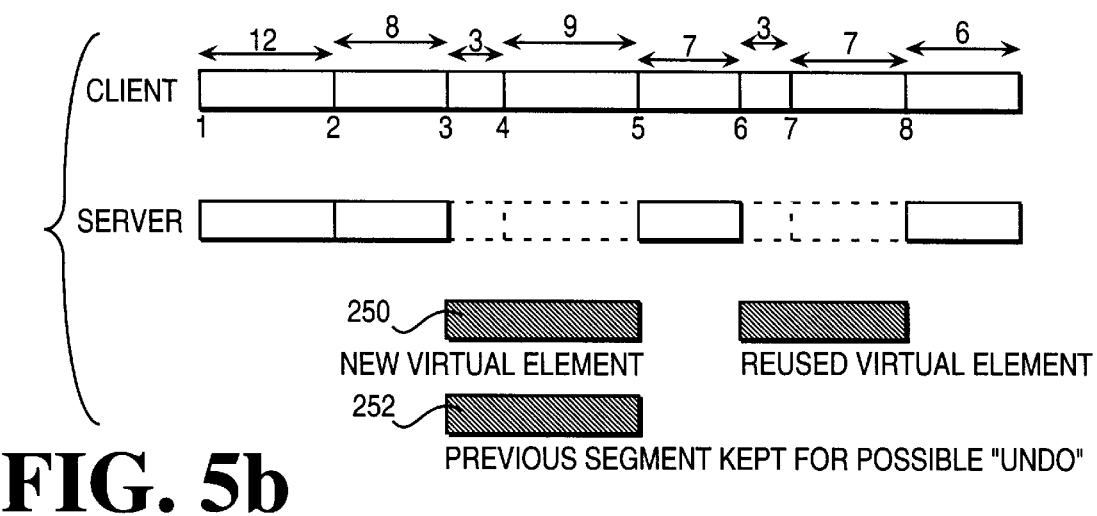
Figure 6A:
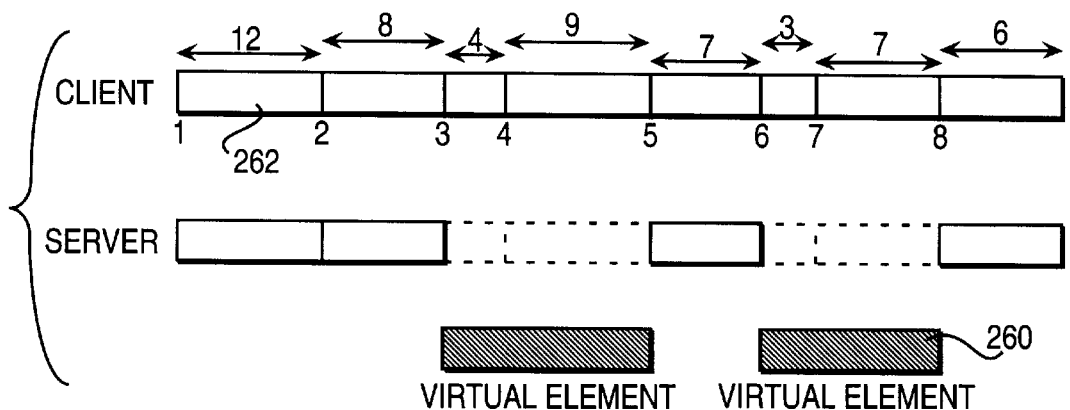
FIGS. 6a and 6b show a scenario where a user requests a subset of a previous play list for a preview. A virtual segment that is not part of the preview segments in nonetheless maintained for later use.
Figure 6B:
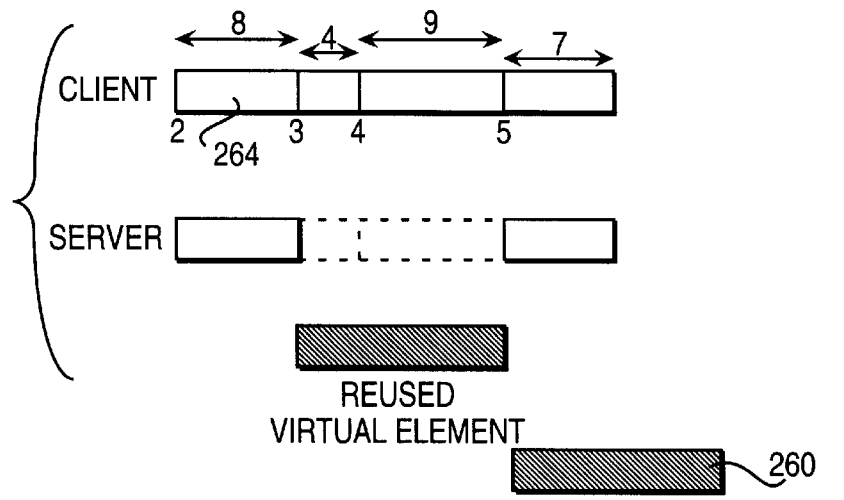

As shown in FIGS. 5a and 5b, even where a new virtual segment 250 replaces a prior virtual segment 252, the prior segment 252 may be kept in case the user decides to "undo" the change and revert to the previous sequence that includes the prior virtual segment 252. FIGS. 6a and 6b show a scenario where a user requests a subset 264 of a previous play list 262 for a preview. A virtual segment 260 that is not part of the preview segments in nonetheless maintained for later use.

Figure 7A:
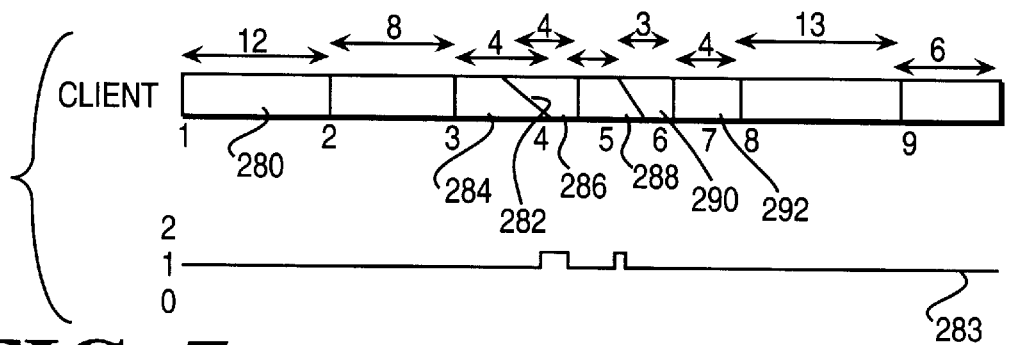
FIGS. 7a, 7b and 7c illustrate the application of the present invention where a play list includes segments from two different channels of a server.
Figure 7B:
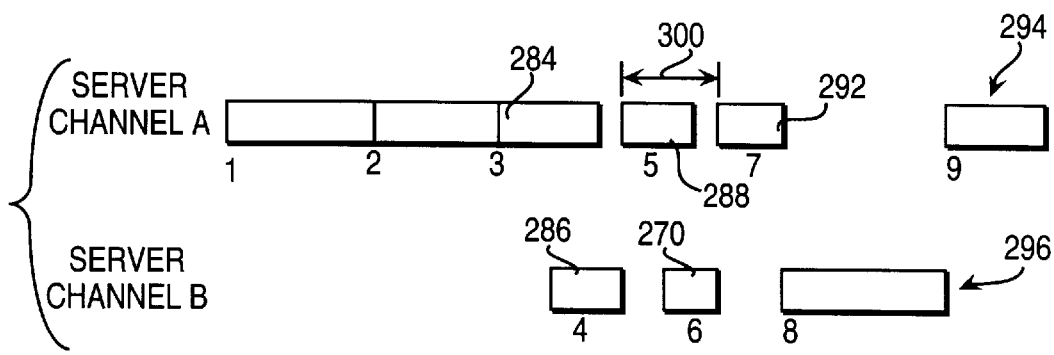
Figure 7C:
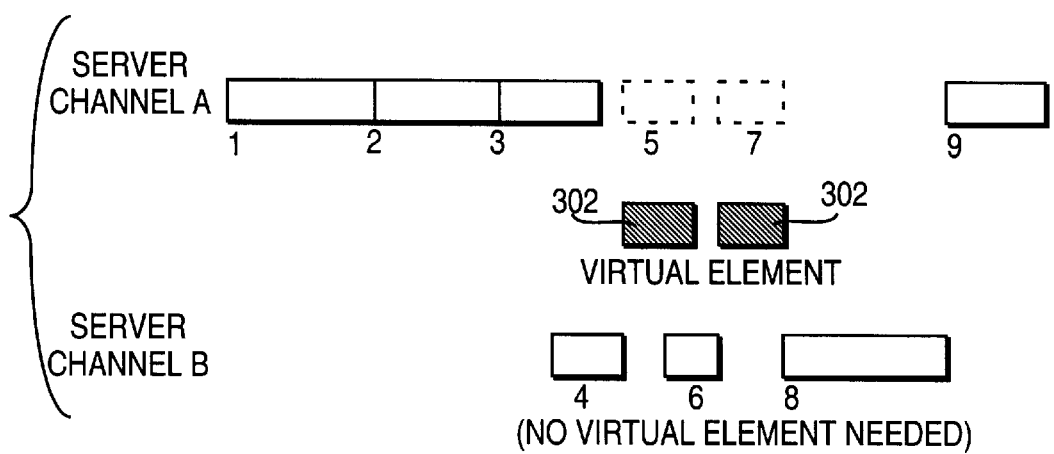

FIGS. 7a, 7b and 7c illustrate the application of the present invention where a play list includes segments from two different channels of a server. A diagonal line, such as line 282 that divides segments 284 and 286 of FIG. 7a, indicates that the two segments 284 and 286, one from each channel, are concurrently accessed and processed as graphed against a time line 283. The play list 286 is parsed by the main control unit 60 as two separate play lists 294 and 296, as illustrated in FIG. 7b, where each of the play lists 294 and 296 corresponds to a different channel. A gap in between segments indicates that no segment from the channel is to be accessed during the time of the gap.

The virtual segment approach is applied separately to each of the lists 294 and 296. As before, the critical time is the period between the starting points of successive segments, as illustrated, for example, by an arrow 300 in FIG. 7b. If these times are less than the threshold, then a virtual segment 302 is created as shown in FIG. 7c.

One embodiment of the method of processing playlists in accordance with the teachings of the present invention will be described with reference to FIGS. 8a, 8b, 8c and 8d. At step 802, the playlist is received. The playlist includes a multiplicity of segments, some of which may not exceed the threshold of time determined that is needed in order to have a seamless transition between playback of segment material. The playlist is then evaluated. Thus, at step 804, the variable next segment (NEXT_SEG) is set to equal the first element of the playlist. At step 806 it is determined whether NEXT_SEG is at the end of the playlist. If it is, then the evaluation of the playlist is complete and the playlist can then be executed, step 808. Otherwise, the segment is evaluated, step 810, to determine whether virtual segments need to be created. Thus, at step 812, if the length of the material of the next segment has material that is less than the threshold, it is desirable to form a virtual segment that is of a length greater than the threshold, step 814.

Figure 8A:
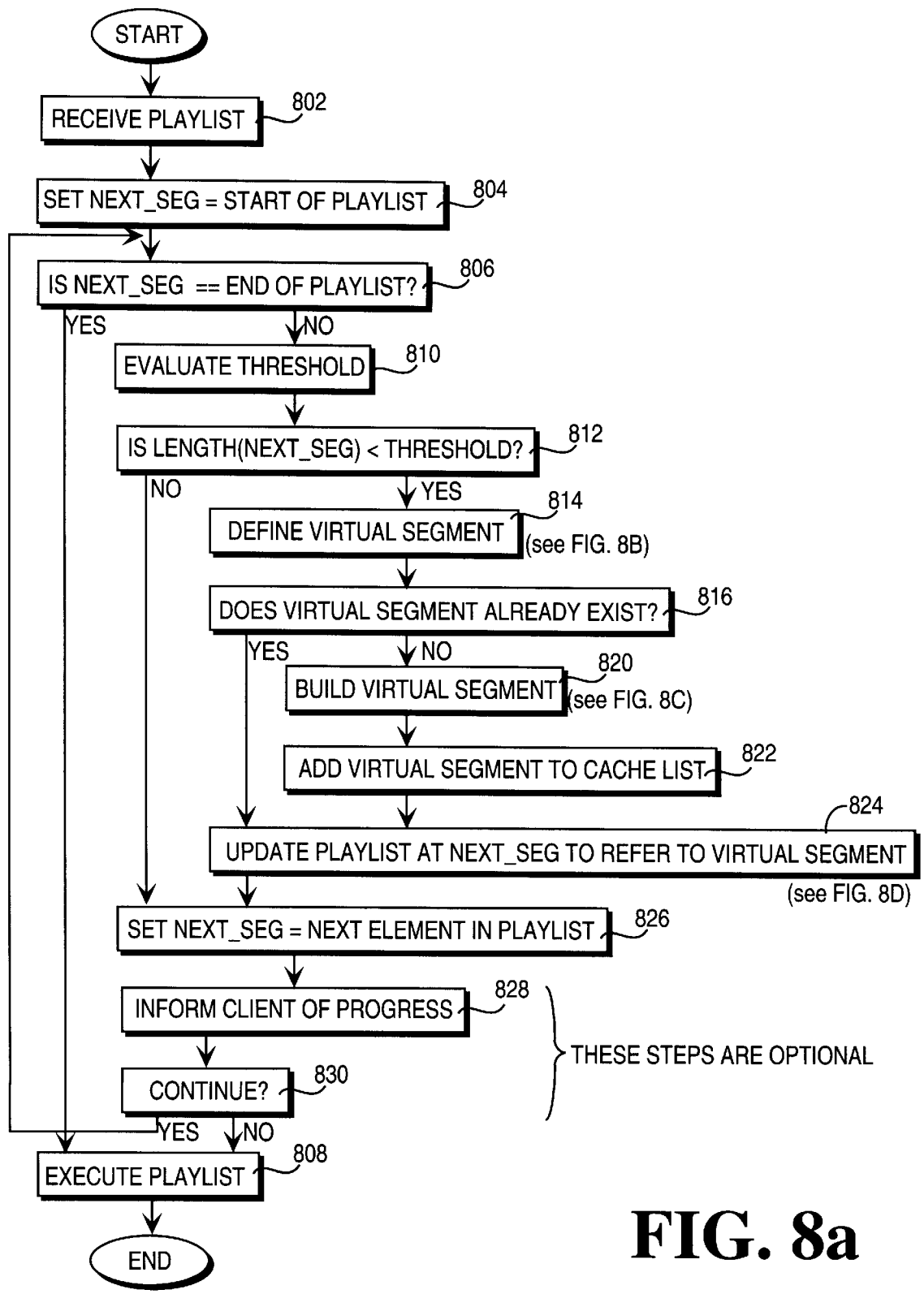
FIGS. 8a, 8b, 8c and 8d are flow charts illustrating one embodiment of a method which generates virtual segments in accordance with the teachings of the present invention.
Figure 8B:
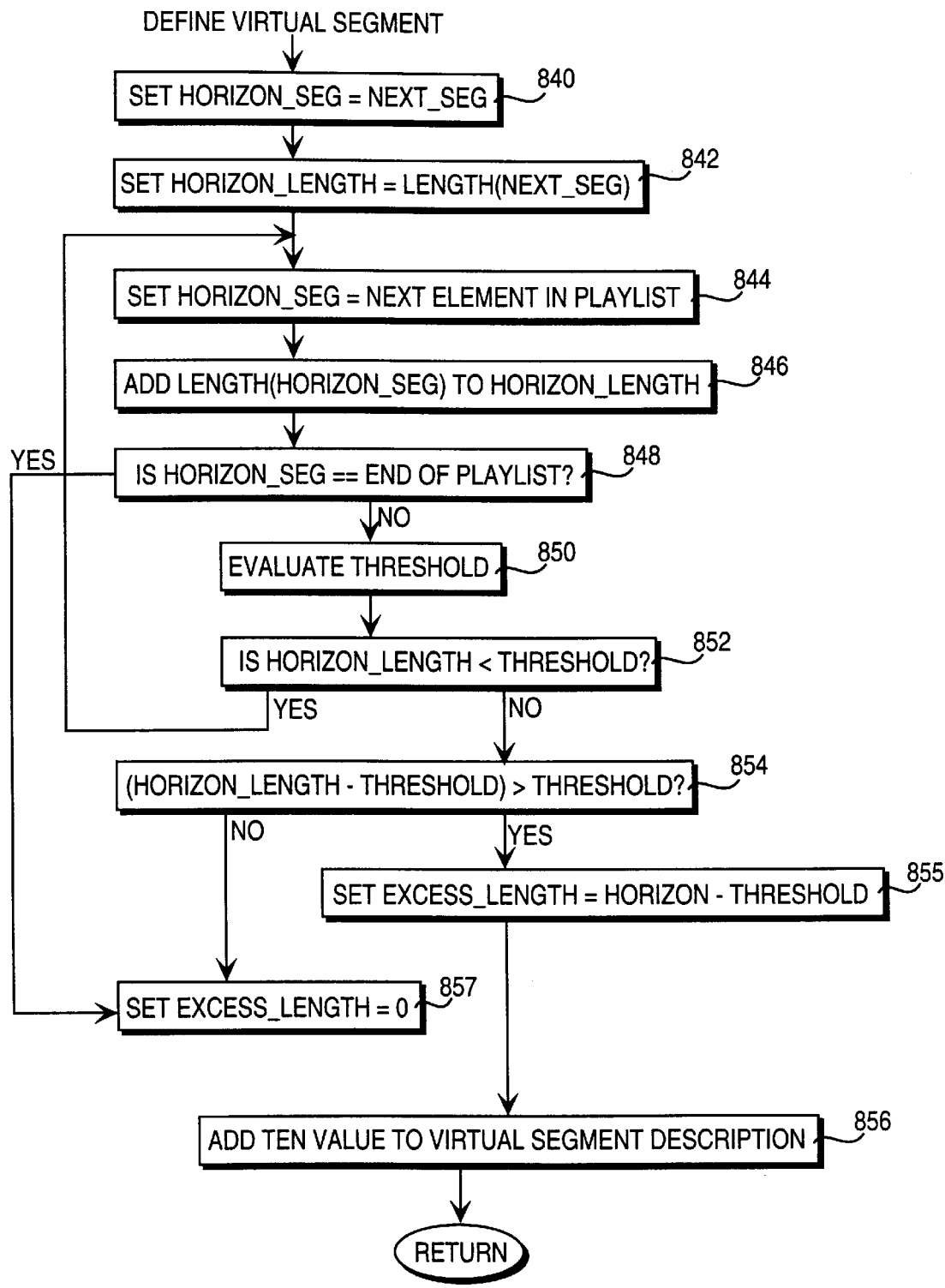

FIG. 8b illustrates the process for defining the virtual segment. At step 840 the variable horizon segment (HORIZON_SEG) is set to equal the next segment (NEXT_SEG). Correspondingly, at step 842, the length value of the horizon segment is set to equal the length of NEXT_SEG. The horizon segment is then set to equal the next element in the playlist. The length value of the horizon segment is incremented by an amount equal to the next element in the playlist, step 846. If the horizon segment is at the end of the playlist, the excess length is set to be equal to zero. The virtual segment size is a predefined multiple of a unit virtual size (virtual-segment-size) of a predefined virtual segment stored in memory.

If the horizon segment is not at the end of the playlist, step 848, the threshold is evaluated, and if the horizon length is less than the threshold, then the virtual segment is formed to include the next element in the playlist, steps 844, 846, 848, 850, 852. Once the length of the horizon segment is greater than the threshold, then at step 854 the excess length value is set to equal the portion of the horizon segment which is not necessary or desirable to copy to the virtual segment. The actual length value is included in the information that is part of the virtual segment.

Referring back to FIG. 8a, once the virtual segment is defined, that is by identifying the segments which form the virtual segment and the length of the material of the virtual segment, it is determined whether a virtual segment is formed by the same segments already exists and if the virtual segment pre-exists, step 816, then at step 824, the playlist is updated to refer to the pre-existing virtual segment, otherwise, a new virtual segment is built, step 820, and added to the cache, step 822.

Figure 8C:
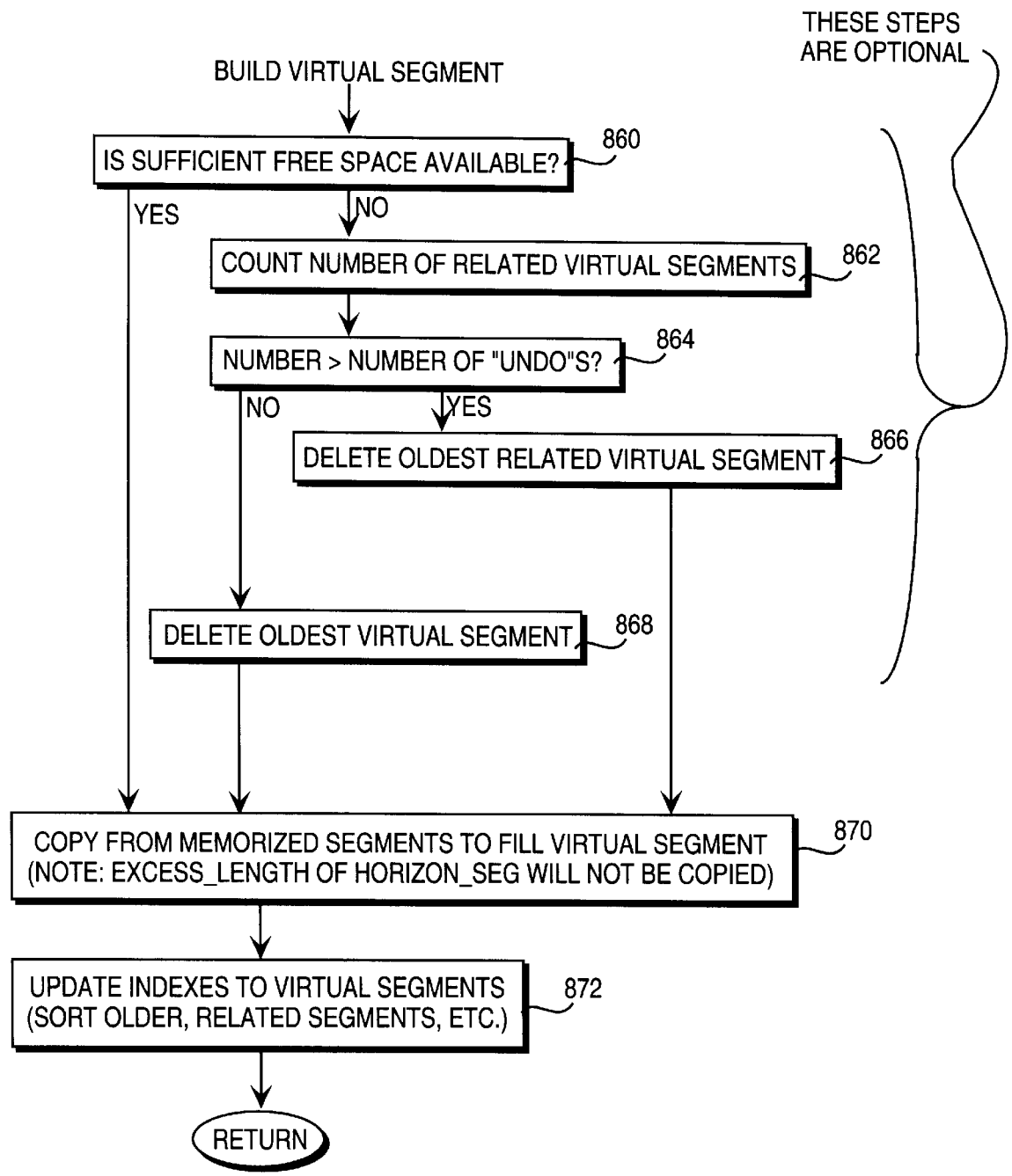

The process of building the virtual segment is described with reference to FIG. 8c. At step 816 it is determined whether sufficient free space is available in the cache memory to build the material of the virtual segment. If there is insufficient memory, at step 862, a number of virtual segments that are related are counted, and if the number is greater than a predetermined number of undo segments, at step 864, the oldest related virtual segment is deleted, step 866; otherwise the oldest virtual segment is deleted, step 868. An undo segment is one marked as no longer used. It is readily apparent that a number of different algorithms can be used to free up cache memory when none is available, and that the steps described, 860, 862, 864, 866, 868 are just one example.

At step 870, the corresponding materials that form the virtual segment are copied from memory into the cache memory. As noted earlier, if the horizon segment is very long, it is more efficient to copy into the virtual segment only as much of the initial part of the segment as is needed and leave the remaining excess length in its original place.

At step 872, the indices to the virtual segments are then updated such that the material of the virtual segment is referenced from the cache memory in place of the original segments in the playlist that are now part of the virtual segment. Thus, during execution of the playlist, the virtual segment material will be referenced in the place of the individual segments which form the virtual segment.

Figure 8D:
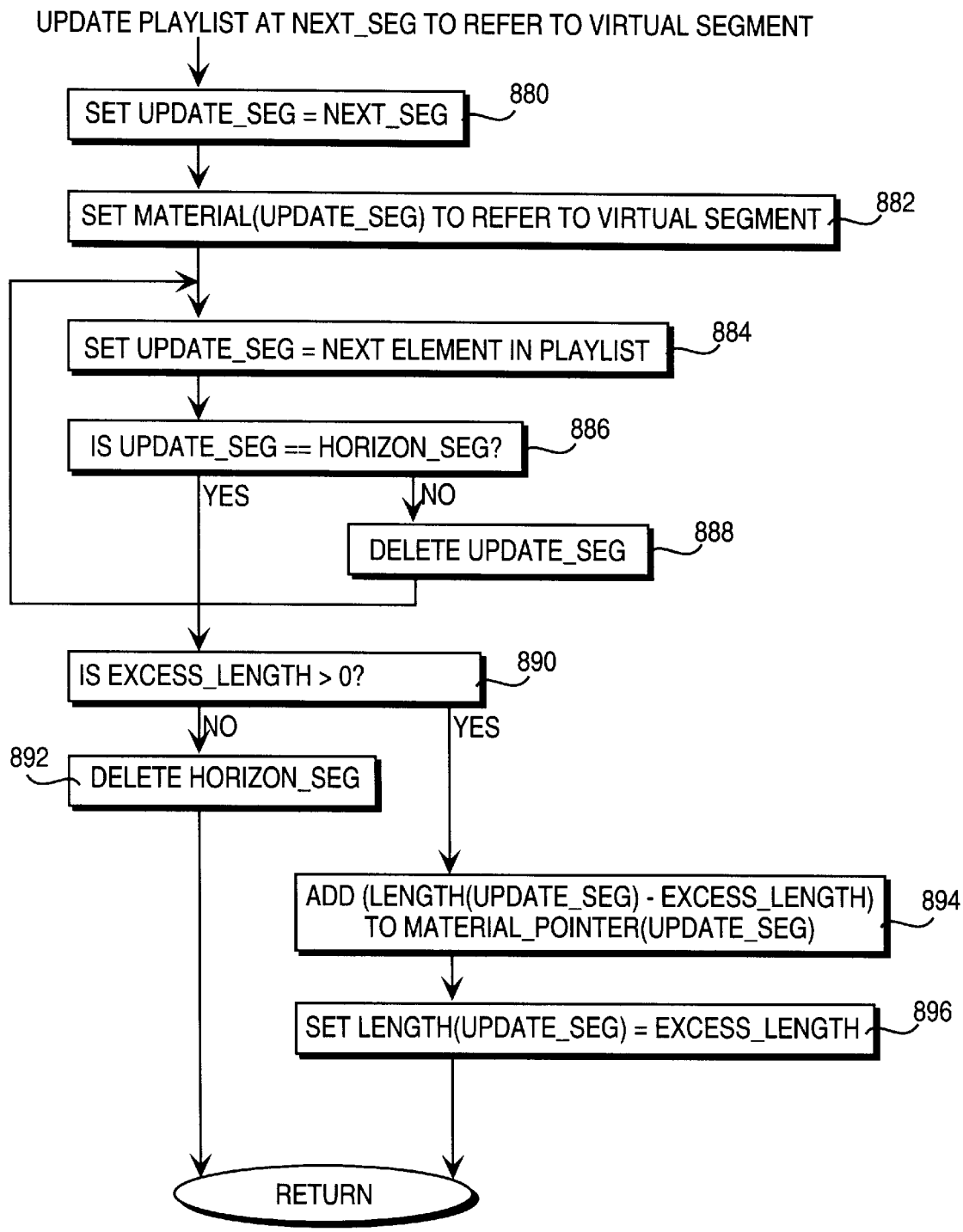

Referring back to FIG. 8*a*, the playlist also is updated to refer to the virtual segment. This is illustrated in FIG. 8*d*. At step 880, the update segment is set to equal the next segment. The virtual segment includes an identification of the segments it includes and a pointer to the cache location where the material which forms the segment is located. Therefore, the material pointer of the segment is set to refer to the cached copy of the material. For example, instead of the disk memory where the video segment is stored, the process refers instead to the cache memory where the copied material, forming the material segment that includes that particular video segment, is stored. At step 884, the updated segment is set to the next segment on the playlist. If the updated segment is not equal to the horizon segment, then at step 886 the updated segment is simply deleted as it is an interim segment of the virtual segment. This process continues with each element in a playlist until the segment that has been identified as the horizon segment is reached. At this point, at step 890, if the excess length determined earlier is not greater than zero, then the horizon segment is deleted. Otherwise, at step 894, the difference of the length of the update segment and the excess length is added to the material pointer and the length of the update segment is set to equal the excess length, step 896. Thus, the pointer to the material is adjusted to point to the subsequent material and the length of the material to be replayed is correspondingly reduced. Update_seg is therefore adjusted to only reply to a last portion of the segment (since the beginning portion is now part of the virtual segment).

Once the playlist is updated, referring back to FIG. 8*a*, step 824, the next element in the playlist is set to the next segment and the process is continued until the playlist is processed. Optionally, at step 828, the user may be informed of the progress of the evaluation through some sort of log or display, step 828. Once complete, at step 808, the playlist is executed.

As previously described, the material which forms the virtual segments is stored in a cache and a play list points to the address of the virtual segment material in the cache. In the preferred embodiment, the cache comprises part of the magnetic (or optical mass) storage device 84 that includes the other source material but it will be appreciated that the cache may reside on other memories. To prevent the entire mass storage device 84 from being used up with cached virtual segments, the system is configured with a threshold percentage (e.g. 5%) of the mass storage device 84 to be potentially used for caching. The least recently used algorithm may be used to eliminate segments once the threshold is exceeded.

The size of the cache list is preferably subject to modification by the user. For example, the user may select a cache size according to the following heuristic:

NONE=Commercial buffer applications
SMALL=long form (features/drama)
MEDIUM=short form (magazine/news)
LARGE=commercials/animation The cache list may be cleared any time the system is cold started. However, typically a large play list will be built up and previewed end to end. Then, if changes are needed in a small section of the program, that section will be previewed, modified, previewed, etc. Then the entire play list will be previewed again.

If the whole play list needed some cached segments which were not accessed when the smaller segment was being worked on, the user will not want to wait while these segments are rebuilt but this would occur if the cache list is cleared any time the system is cold started.

Therefore, it is desirable to maintain these segments until it is determined with reasonable certainty that they are no longer needed. This may be accomplished by dividing the segments into two types: 1) if a segment is supplanted by a modified version of itself, it's likely to be because the user is experimenting with changes in that area and the only reason to maintain the origin segment is in the case of an "undo;" and 2) if a segment remains unused for a long time, it may still be desired but the system may need the disk space for something else.

Therefore, two lists of unreferenced segments are kept, corresponding to these two types. When a new segment must be created and the empties have been used, the caching manager removes a type 1 ("undo") first. If the type 1 list gets down to a threshold length (=number of saved undos), the manager takes one from the type 2 (aging) list instead. There optional steps are shown in steps 862, 864, 866, 868 in FIG. 8*c*.

The main control unit 60 requires time to review the playlist and create the new segments. In one embodiment, when the main control unit 60 receives a play list from the computer 25, the main control unit 60 parses through the play list to determine the required amount of time and sends a message to the computer 25 that indicates that the main control unit 60 needs that amount of time. The user then signals the main control unit 60 to proceed.

In many cases, the user will prefer to preview as much as possible as quickly as possible, rather then waiting for the main control unit 60 to create a seamless preview according to the techniques described herein. Thus, the user may indicate whether it wishes to preview without waiting for the creation of virtual segments, resulting in possibly "jerky" playback or even the halting of playback at a particular segment. Alternatively, the user may signal the main control unit 60 to create the seamless play list that includes virtual segments.

If the user elects to create the seamless play list, the main control unit 60 updates its progress in creating the segments and provides this information to the computer 25, which may display the information in the form of a progress bar. The user, at any time, may decide to start previewing before the seamless play list is created. This optional step of notifying the operator is shown in steps 828, 830 of FIG. 8*a*. Alternatively, the computer 25 may be programmed to automatically provide a "start playing" signal to the main control unit 60 if certain conditions are met.

The main control unit's 60 progress updates may include a look ahead function that indicates that the main control unit 60 has looked ahead for a certain number of seconds and needs to build a certain number of segments. Further, the computer 25 program may send a play list with a command that indicates that the main control unit 60 should scan the play list, cache as necessary, but not provide a preview until later. Preferably, the main control unit 60 is able to do the scan and cache while doing jog/shuttle on the other channel.

While the invention has been described in conjunction with preferred embodiments, it is evident that numerous alternatives, modifications, variations and uses will be apparent to those skilled in the art in light of the foregoing description. For example, while the computer 25 has been shown as distinct from the main control unit 60, it will be appreciated that the user interface and the memory control may reside on the same computer. Many other modifications are possible, and the scope of the present invention should therefore be measured by the following claims.

We claim:

1. A computer implemented method for optimizing a playlist of material comprising the steps of:
   receiving a play list, said play list comprising a plurality of segments, the segments corresponding to different material portions of the material;
   determining if material corresponding to one of the plurality of consecutive segments is less than a predetermined duration;
   if a duration of material of one segment is less than the predetermined duration, creating a virtual segment of material of consecutive segments including the one segment and updating the playlist to refer to the virtual segment.

2. The method as set forth in claim 1, wherein each segment points to a storage location where corresponding material is stored.

3. The method as set forth in claim 1, wherein the predetermined duration is an amount of time corresponding to the amount of time needed to retrieve corresponding material and begin play of a segment.

4. The method as set forth in claim 1, further comprising the step of storing virtual segment material in a cache.

5. The method as set forth in claim 1, wherein the step of creating a virtual segment comprises the step of combining material from the one segment and at least a portion of material from the next segment to form one virtual segment, the combination of the data from the one segment and the material portion of the next segment being sufficiently large such that the duration of the virtual segment material is greater than the predetermined duration.

6. The method as set forth in claim 1, wherein the step of creating a virtual segment comprises the step of combining material of the one segment and the next segment to form one virtual segment material.

7. The method as set forth in claim 1, wherein the step of updating the playlist comprises the step of replacing the one and next segment with the virtual segment.

8. The method as set forth in claim 1, wherein if virtual segment material pre-exists, said method further comprising the steps of re-using the corresponding pre-existing virtual segment and material.

9. A computer implemented method for optimizing a playlist of material, said method comprising the steps of:
   receiving a playlist, said playlist comprising a plurality of segments, the segments corresponding to different portions of the material;
   determining if material of segments consecutively listed in the playlist is less than a predetermined duration; and
   if material of consecutive segments is less than the predetermined duration, creating a virtual segment that includes material from one segment and a next segment of consecutive segments, and
   updating the playlist to refer to the virtual segment.

10. The method as set forth in claim 9, wherein each segment points to a storage location where corresponding material is stored.

11. The method as set forth in claim 9 further comprising the step of storing virtual segment material in a cache.

12. The method as set forth in claim 9, wherein the step of creating a virtual segment comprises the step of combining material from the one segment and at least a portion of material from the next segment to form one material, the combination of the material from the one segment and the material portion of the next segment being sufficiently large such that the duration of the virtual segment material is of a duration greater than the predetermined duration.

13. The method as set forth in claim 9, wherein the step of creating a virtual segment comprises the step of combining material of the one segment and the next segment to form one virtual segment material.

14. The method as set forth in claim 9, wherein the step of updating the playlist comprises the step of replacing the one and next segment with the virtual segment.

15. A media processing system comprising a processor device coupled to receive a playlist a plurality of material, said segments corresponding to portions of material, said processor device configured to evaluate the playlist to determine if material of a segment is less than a predetermined duration and to create a virtual segment that includes material from one segment and a next segment of consecutive segments and update the playlist to refer to the virtual segment if the one segment is less than the predetermined duration.

16. The media processing system as set forth in claim 15, further comprising a cache to store material of virtual segments.

17. The media processing system as set forth in claim 15, wherein each virtual segment comprises a pointer that points to a storage location where corresponding material is stored.

18. The media processing system as set forth in claim 15, wherein the predetermined duration is an amount of time corresponding to the amount of time needed to retrieve and begin play of material of the next segment.

19. The media processing system as set forth in claim 15, wherein the processor is further configured to update the playlist by replacing the one and next segment with the virtual segment.

20. The media processing system as set forth in claim 15, wherein if virtual segment data pre-exists, said processor device further configured to re-use the corresponding pre-existing virtual segment and material.

21. A computer readable medium containing executable instructions which, when executed in a processing system, causes the system to perform the steps for optimizing execution of a playlist comprising:
   receiving a play list, said play list comprising a plurality of segments, the segment corresponding to different portions of material;
   determining if material corresponding to one of a plurality of consecutive segments is less than a predetermined duration;
   if material of one of a plurality of consecutive segments is less than the predetermined duration creating a virtual segment of material of consecutive segments including the one segment and updating the playlist to refer to the virtual segment.

22. The computer readable medium as set forth in claim 21, wherein the instruction for creating a virtual segment comprises instructions that combine material from the one segment and at least a portion of material from the next segment to form one virtual segment, the combination of the material from the one segment and the material portion of the next segment being sufficiently large such that the duration of the virtual segment material is greater than the predetermined duration.

23. The computer readable medium as set forth in claim 21, wherein the instruction for creating a virtual segment comprises instructions that combine material of the one segment and the next segment to form one virtual segment material.

* * * * *

UNITED STATES PATENT AND TRADEMARK OFFICE
CERTIFICATE OF CORRECTION

PATENT NO.    : 5,924,071
DATED         : July 13, 1999
INVENTOR(S)   : Morgan et al.

It is certified that error appears in the above-identified patent and that said Letters Patent is hereby corrected as shown below:

In column 8 at line 22 delete "caching" and insert --cacheing--

Signed and Sealed this

Twenty-seventh Day of March, 2001

Attest:

NICHOLAS P. GODICI

*Attesting Officer*    *Acting Director of the United States Patent and Trademark Office*